Dec. 9, 1947.   A. B. HEATH   2,432,417
TRACTOR CONTROL DEVICE
Filed March 7, 1946   3 Sheets-Sheet 1
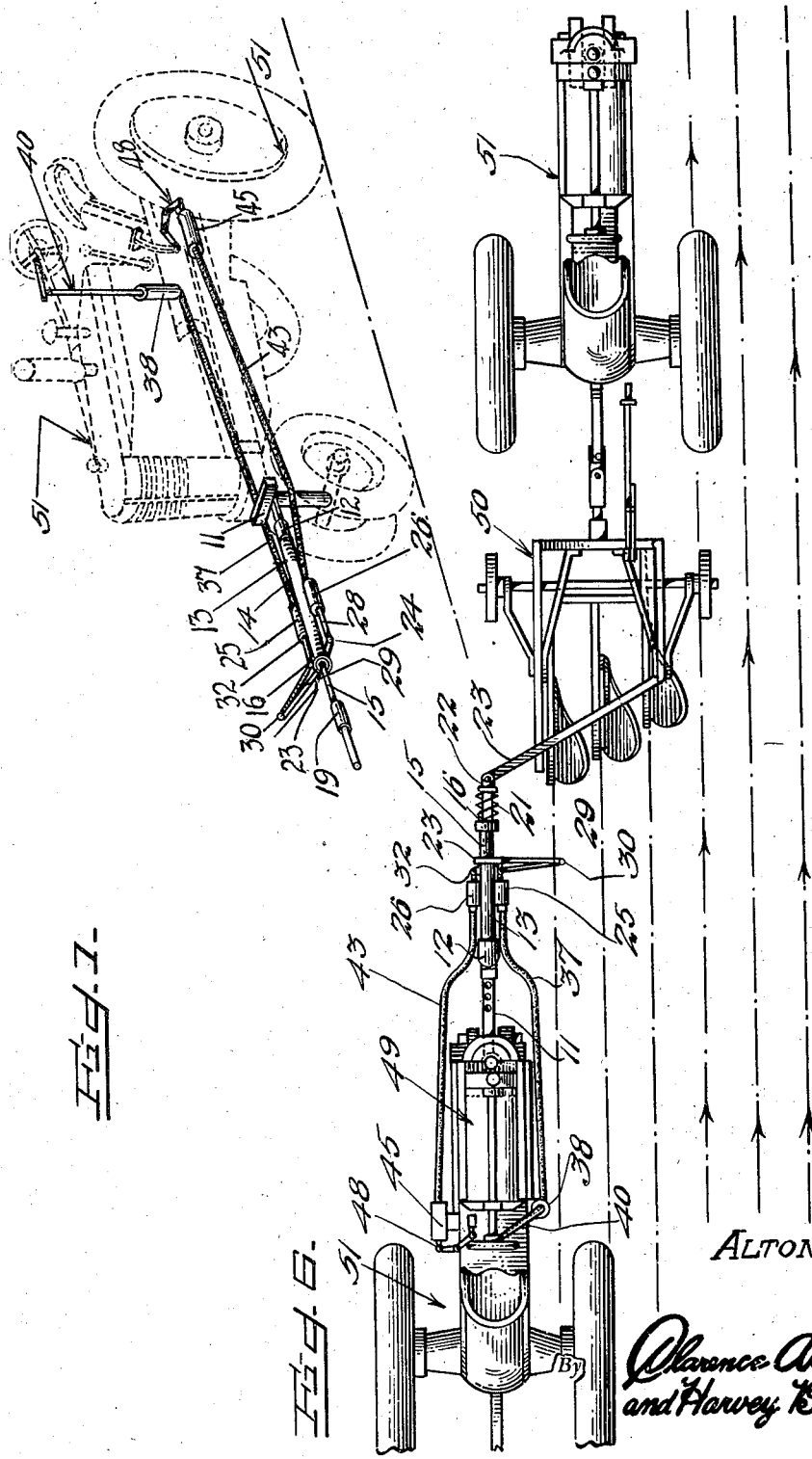
Inventor
ALTON B. HEATH.
By Clarence A. O'Brien
and Harvey B. Jacobson
Attorneys Dec. 9, 1947.  A. B. HEATH  2,432,417
TRACTOR CONTROL DEVICE
Filed March 7, 1946  3 Sheets-Sheet 2
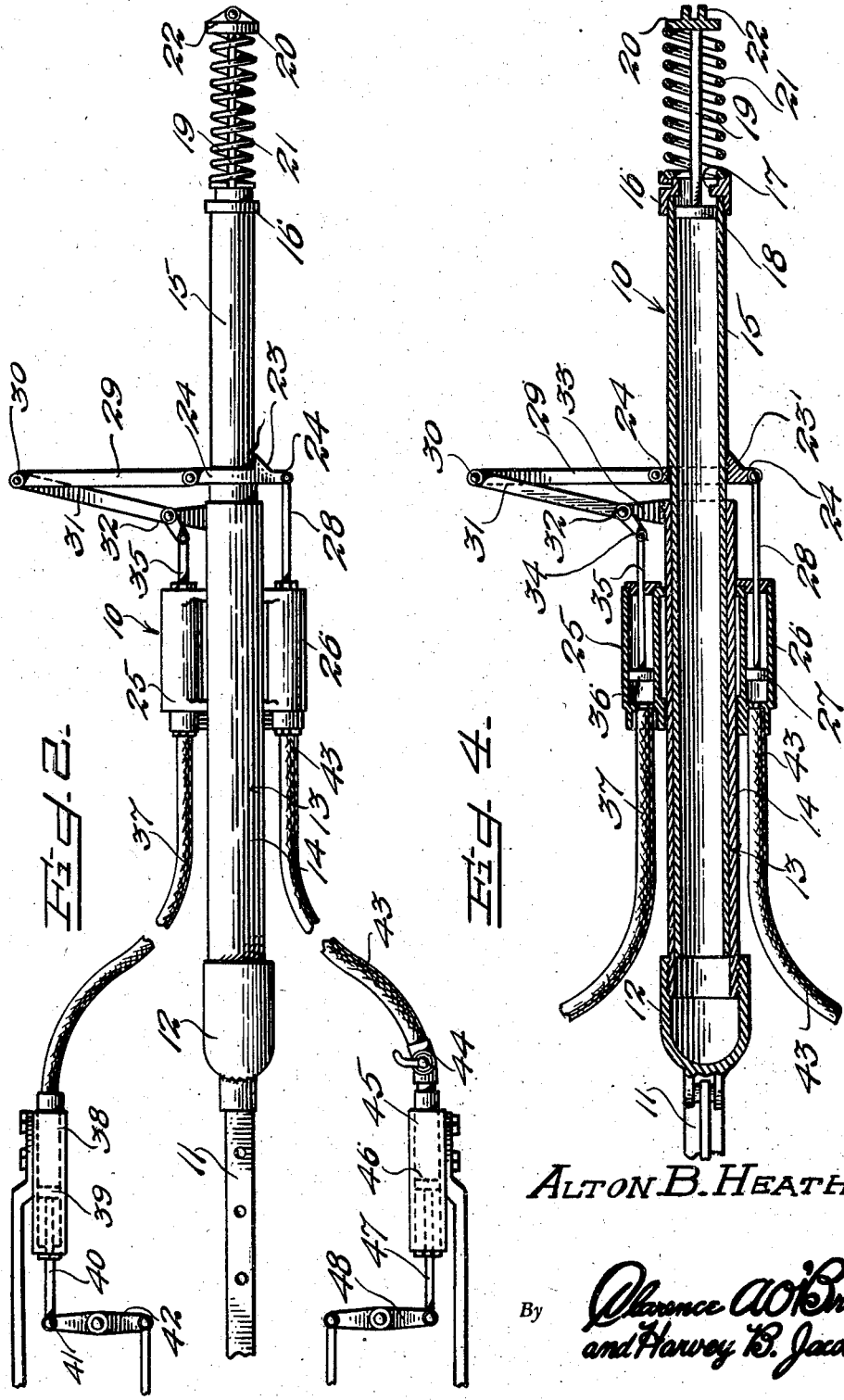
Inventor
ALTON B. HEATH.
By *Clarence A. O'Brien
and Harvey B. Jackson*
Attorneys

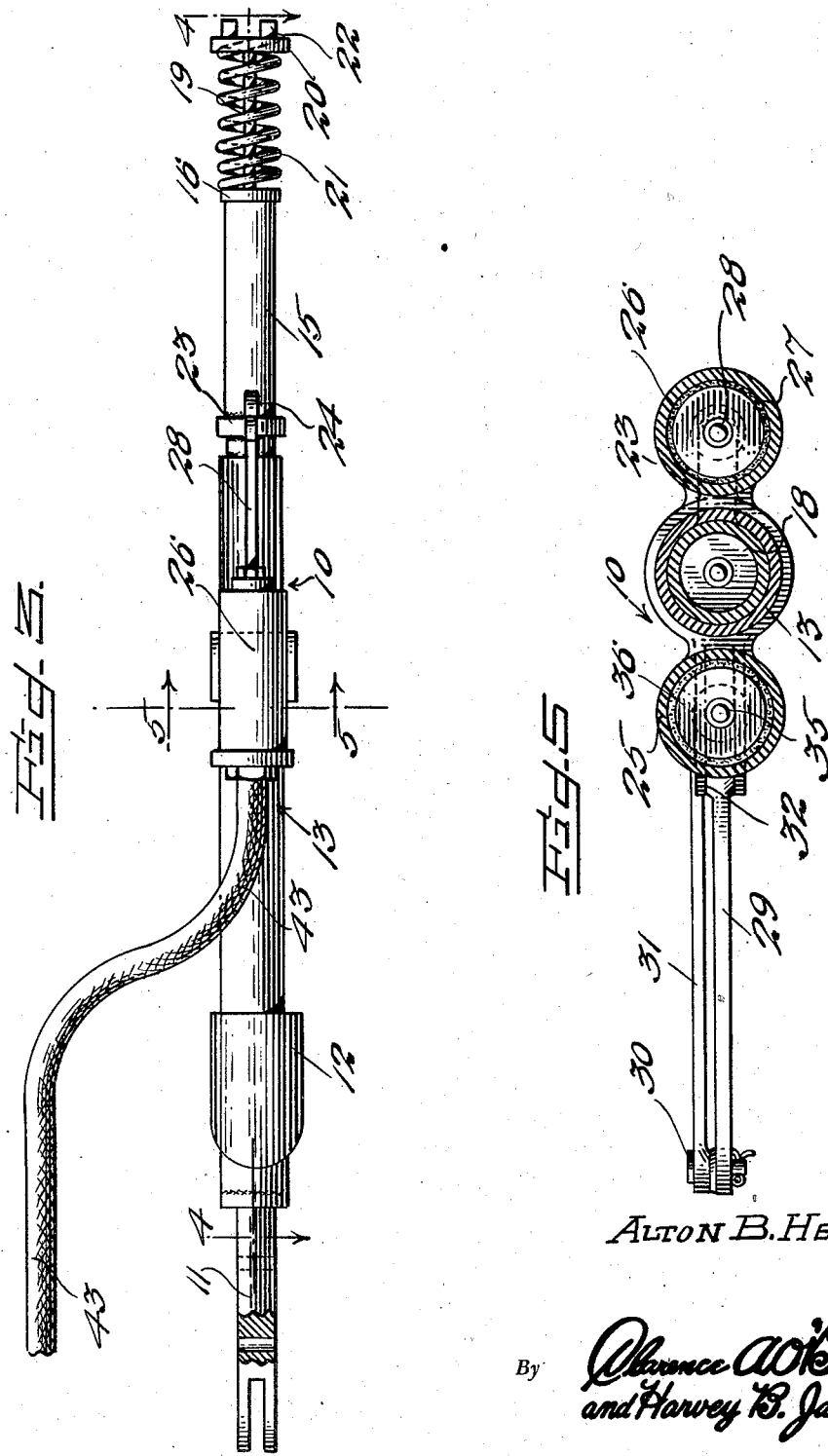

Patented Dec. 9, 1947

2,432,417

UNITED STATES PATENT OFFICE 2,432,417

TRACTOR CONTROL DEVICE

Alton B. Heath, Tipton, Ind.

Application March 7, 1946, Serial No. 652,534

1 Claim. (Cl. 180—14)

This invention relates to a tractor control device and more particularly to a control device for use on a farm tractor.

In order to facilitate the preparation and cultivation of soil and crops on large farms and in large fields it is customary to attach the earth working machinery to two or more tractors and to operate them in unison in order to shorten the time required for the preparation of the earth or the cultivation of crops. In order properly to handle such tractors it has heretofore been necessary to employ the services of a driver for each individual tractor with the result that much time and manpower has been consumed. With the high wages now demanded by farm labor and the shortage thereof, it has become uneconomical and at times impossible to cultivate large areas with the result that despite the tremendous demands for foodstuffs the farming industry has been required to restrict the amount of territory placed under cultivation.

The primary object of this invention is to increase the area of farm land which may be cultivated by a single operator of a tractor, or train of tractors.

Another object is to enable a number of tractors to be connected together in such a manner that the power of each may be utilized to operate an implement connected thereto, and automatically to control the operation of each individual tractor by the movements of a leading tractor requiring but one operator.

The above and other objects may be attained by employing this invention which embodies among its features a telescopic tiller arm carried by and adapted to steer a trailing tractor, means carried by the tiller arm for engaging and disengaging the clutch of said trailing tractor as the tiller arm extends or telescopes, and means establishing connection between the tiller arm and a leading tractor for steering the trailing tractor and effecting telescopic movement of the tiller arm whereby the movements of the trailing tractor may be correlated with those of the leading tractor.

Other features include hydraulic cylinders mounted on the tiller arm, hydraulic cylinders mounted on the trailing tractor for controlling the movements of the clutch and the throttle thereof, and pistons operating in the cylinders for forcing hydraulic fluid into the clutch and throttle operating cylinders, so that as the arm telescopes and extends the clutch and throttle control mechanism will be actuated.

In the drawings:

Figure 1 is a perspective view of my improved tractor control device showing it mounted on a conventional farm tractor, the outline of said tractor being shown in broken lines, Figure 2 is a top plan view of the control device, Figure 3 is a side view of Figure 2, Figure 4 is a horizontal sectional view taken substantially along the line 4—4 of Figure 3, Figure 5 is a transverse sectional view taken substantially along the line 5—5 of Figure 3, and Figure 6 is a plan view showing a trailing tractor connected to a leading tractor by the use of my invention.

Referring to the drawings in detail, my improved tractor attachment designated generally 10 comprises a mounting bar 11 which is adapted to be connected to the steering yoke of a conventional farm tractor as suggested in Figure 1. This bar 11 carries at its forward end a socket 12 into which one end of a telescopic tiller arm designated generally 13 is fitted. This tiller arm constitutes a tubular body 14 into which a tubular piston 15 slides. Carried at the extreme outer end of the piston 15 is a cap 16 provided with a central opening 17, and slidably mounted within the tubular piston rod 15 is a head 18 carrying a stem 19 which projects forwardly through the opening 17 and carries at its forward end a stop plate 20. A compression coil spring 21 extends between the forward end of the cap 16 and the rear face of the plate 20 in order to hold the parts extended as shown in the drawings. Carried by the plate 20 is a suitable coupler 22 to which the rear end of a drawbar 23 is connected (Figure 6).

Secured to the telescopic piston 15 between the forward end of the tubular member 14 and the cap 16 is a stop collar 23' carrying outstanding ears 24 at diametrically opposite points, and mounted on the tubular member 14 at diametrically opposite points are cylinders 25 and 26, respectively. A piston 27 is operable in the cylinder 26 and its piston rod 28 is connected to one of the ears 24 as will be readily understood upon reference to Figure 4. A link 29 is pivotally connected to the ear 24 opposite to that which the rod 28 is connected and the opposite end of this link is pivotally connected as at 30 to a lever 31 pivoted internally intermediate its ends as at 32 to a bracket 33 carried by the end of the sleeve 14 opposite that entering the socket 12. The end of the lever 31 opposite that connected to the link 29 is pivotally connected as at 34 to a piston rod 35 which in turn is connected to a piston 36 operably mounted in the cylinder 25. It will thus be seen that as the member 15 reciprocates within the tubular member 14 the pistons 27 and 36 will reciprocate in their respective cylinders 26 and 25 but in opposite directions.

Leading rearwardly from the cylinder 25 is a flexible tube 37 which is connected at its opposite end to an operating cylinder 38 mounted on the tractor to which the device is connected in the immediate vicinity of the throttle lever thereof. This cylinder 38 has working therein a piston 39, the piston rod 40 of which is connected as at 41 to the throttle lever 42 of the tractor, so that as the piston 36 moves within the control cylinder 25, fluid contained within the system will cause the piston 39 to move in the cylinder 38 and operate the throttle lever.

Leading rearwardly from the rear end of cylinder 26 is a flexible tube 43 the opposite end of which is connected to a delayed action valve 44 carried at one end of a cylinder 45. This cylinder is mounted on the frame of the tractor and has working therein a piston 46, the piston rod 47 of which is connected to the clutch operating lever 48 of the tractor. It will thus be seen that as the piston 27 moves in the cylinder 26, the piston 46 will also move in its piston 45, but due to the valve 44 the movement of the piston 46 is so regulated as to avoid too rapid engagement and disengagement of the clutch of the tractor.

It is to be noted that the length of throw of the pivot 34 is considerably less than the length of throw of the pivot 30 on the lever 31 with the result that the magnitude of movement of the piston 36 for the movement of the member 15 and the piston 27 is much less, and it is to be understood that this length of movement may be varied so as to avoid overthrowing the throttle in either direction.

In operation the device is attached by connecting the bar 11 to the steering wheels of a trailing tractor designated generally 49, and the cylinders 38 and 45 are respectively mounted near the throttle and clutch of the trailing tractor. The forward end of the telescopic tiller 13 is connected by means of the coupling 22 to the bar 23 which in turn is fixed to the frame of a piece of farm machinery designated generally 50 which is attached in the conventional manner to a leading tractor 51 all as shown in Figure 6. The leading tractor 51 is driven in the conventional manner by an operator seated in the driver's seat thereof and as the tractor 51 starts forward and exerts pull on the farm machine 50 it will be obvious that pull will be exerted on the telescopic tiller 13 through the medium of the bar 23. Such pull will tend to extend the telescopic tiller and move the member 15 forwardly with relation to the tube 14, thus exerting pull on the stop collar 23 and cause the piston 27 to move forwardly in its cylinder 26 and the piston 36 to move rearwardly in its cylinder 25. The forward movement of the piston 27 will cause fluid contained in the cylinders 26 and 45 and in the flexible tube 43 to flow into the cylinder 26 so as to release the clutch, it being understood that the rapidity with which the fluid flows is governed by the valve 44 in order to prevent too rapid engagement of the clutch of the trailing tractor. Simultaneously with the forward movement of the piston 27 the piston 36 will move rearwardly and cause fluid contained in the cylinder 25 to be forced through the flexible tube 37 into the cylinder 38 and cause the piston 39 therein to move and advance the piston rod 40 so as to open the throttle of the trailing tractor. As a result, the trailing tractor will start to move forward under its own power so as to exert pull on any piece of farm machinery that may be connected thereto. Obviously should the leading tractor slow down or stop, the trailing tractor will endeavor to run up upon it thus causing the telescopic tiller arm 13 to move the pistons 27 and 36 in their respective control cylinders in a reverse direction so as to disengage the clutch and simultaneously close the throttle on the trailing tractor. Obviously due to the fact that the tiller arm 13 is connected to the steering mechanism of the trailing tractor, as the lead tractor turns in one or the other direction and the farm machinery connected thereto likewise follows its course, the tiller arm will turn the steering wheels of the trailing tractor and cause it to follow the course of the lead tractor.

While in the foregoing there has been shown and described the preferred embodiment of this invention it is to be understood that minor changes in the details of construction, combination, and arrangement of parts may be resorted to without departing from the spirit and scope of the invention as claimed.

I claim:

A tractor attachment to regulate the direction and speed of motion of a trailing tractor with the direction and speed of motion of a leading tractor which includes a telescopic tiller arm attached to the steering mechanism of the trailing tractor, a cylinder carried by one section of the telescopic tiller arm, a piston working in said cylinder and directly operable by the other section of the telescopic tiller arm, means actuated by the movement of the piston in the cylinder for engaging and disengaging the clutch of the trailing tractor, a second cylinder carried by the section of the tiller arm to which the first-mentioned cylinder is attached, a piston working in said second cylinder, a lever and link mechanism establishing driving connection between the piston and the other section of the tiller arm to cause the last-mentioned piston to move its cylinder for a distance less than the distance traversed by the first-mentioned piston and means controlled by the movements of the second-mentioned piston for actuating the throttle valve on the engine of the trailing vehicle.

ALTON B. HEATH.

REFERENCES CITED

The following references are of record in the file of this patent:

UNITED STATES PATENTS

| Number | Name | Date |
|---|---|---|
| 1,889,906 | Swan | Dec. 6, 1932 |
| 1,302,686 | Lock | May 6, 1919 |
| 1,804,257 | Greenley | May 5, 1931 |
| 2,311,826 | Grasswick | Feb. 23, 1943 |
| 2,152,017 | Banning, Jr. | Mar. 28, 1939 |
| 2,354,268 | McNamara, Jr. | July 25, 1944 |